(12) United States Patent
Tweedt

(10) Patent No.: US 10,710,705 B2
(45) Date of Patent: Jul. 14, 2020

(54) OPEN ROTOR AND AIRFOIL THEREFOR

(71) Applicant: General Electric Company, Schenectady, NY (US)

(72) Inventor: Daniel Lawrence Tweedt, West Chester, OH (US)

(73) Assignee: General Electric Company, Schenectady, NY (US)

( * ) Notice: Subject to any disclaimer, the term of this patent is extended or adjusted under 35 U.S.C. 154(b) by 418 days.

(21) Appl. No.: 15/636,017

(22) Filed: Jun. 28, 2017

(65) Prior Publication Data

US 2019/0002086 A1 Jan. 3, 2019

(51) Int. Cl.
*B64C 11/18* (2006.01)

(52) U.S. Cl.
CPC .................... *B64C 11/18* (2013.01)

(58) Field of Classification Search
CPC .................................................. B64C 11/18
See application file for complete search history.

(56) References Cited

U.S. PATENT DOCUMENTS

| | | | | |
|---|---|---|---|---|
| 4,652,213 A * | 3/1987 | Thibert | ................... | B64C 11/18 244/35 R |
| 4,726,737 A | 2/1988 | Weingold et al. | | |
| 4,941,803 A * | 7/1990 | Wainauski | ............... | B64C 11/18 244/35 R |
| 4,969,800 A | 11/1990 | Parry et al. | | |
| 5,096,383 A * | 3/1992 | Dobrzynski | ............ | B64C 11/00 416/124 |
| 5,439,353 A | 8/1995 | Cook et al. | | |
| 5,676,522 A | 10/1997 | Pommel et al. | | |
| 5,911,559 A | 6/1999 | Menthe | | |
| 6,315,522 B1 * | 11/2001 | Yamakawa | ........... | B64C 27/467 416/223 R |
| 6,361,279 B1 * | 3/2002 | Rodde | ................... | B64C 27/467 244/35 R |
| 6,671,590 B1 * | 12/2003 | Betzina | ................. | B64C 27/001 415/119 |
| 8,047,802 B2 | 11/2011 | Clemen | | |
| 8,142,165 B2 | 3/2012 | Beckford et al. | | |
| 9,004,866 B2 | 4/2015 | Lee et al. | | |
| 9,162,750 B2 | 10/2015 | Coupe et al. | | |
| 9,340,277 B2 | 5/2016 | Breeze-Stringfellow et al. | | |

(Continued)

*Primary Examiner* — Hung Q Nguyen
*Assistant Examiner* — Brian P Monahon
(74) *Attorney, Agent, or Firm* — General Electric; Pamela Kachur

(57) ABSTRACT

An open rotor airfoil apparatus includes: an airfoil body having pressure and suction sides extending in span from a root to a tip, and in chord between leading and trailing edges. A majority of the leading edge in an outer portion of the airfoil body has a sweep equal to or greater than a predetermined sweep profile, selected to produce a blade-relative velocity component perpendicular to the leading edge, at a tip radius, of Mach 0.75 or less, and to produce a blade-relative velocity component perpendicular to the leading edge, at 65% of tip radius, of Mach 0.87 or less, with the blade-relative velocity component perpendicular to the leading edge varying linearly between the two limits, in the presence of transonic or supersonic relative velocity conditions. Each of the blades has a leading edge thickness greater than 0.45% of the chord, measured at a 0.5% chordwise location.

27 Claims, 8 Drawing Sheets

(56) References Cited

U.S. PATENT DOCUMENTS

| | | | |
|---|---|---|---|
| 2003/0231961 A1* | 12/2003 | Chandraker | F01D 5/141 416/243 |
| 2007/0212223 A1* | 9/2007 | Moffitt | B64C 27/463 416/134 A |
| 2007/0243068 A1* | 10/2007 | Wadia | F01D 5/141 416/223 R |
| 2008/0181780 A1* | 7/2008 | Sonoda | F04D 29/384 416/223 A |
| 2009/0202354 A1* | 8/2009 | Godsk | F03D 1/0641 416/223 R |
| 2010/0272576 A1* | 10/2010 | Karem | B64C 27/467 416/241 A |
| 2013/0008170 A1* | 1/2013 | Gallagher | F01D 5/141 60/772 |
| 2013/0156583 A1* | 6/2013 | Wood | B64C 11/18 416/198 A |
| 2013/0224031 A1* | 8/2013 | Breeze-Stringfellow | B64C 11/18 416/223 R |
| 2014/0271112 A1* | 9/2014 | Morin | F01D 17/105 415/1 |
| 2014/0363276 A1* | 12/2014 | Vetters | F02K 3/04 415/124.2 |
| 2015/0098834 A1* | 4/2015 | O'Neill | F04D 19/00 416/90 R |

* cited by examiner

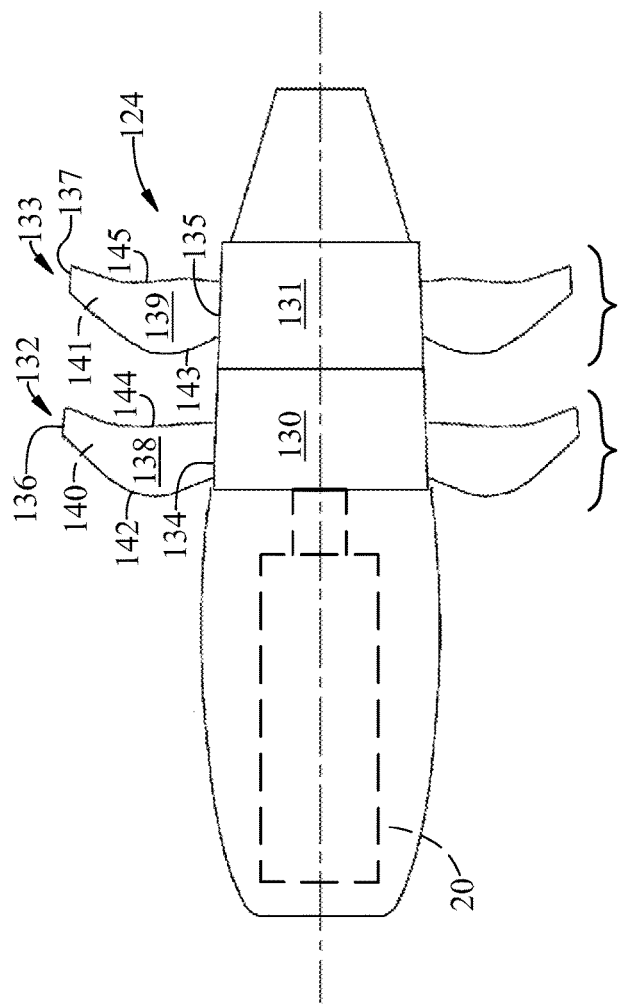
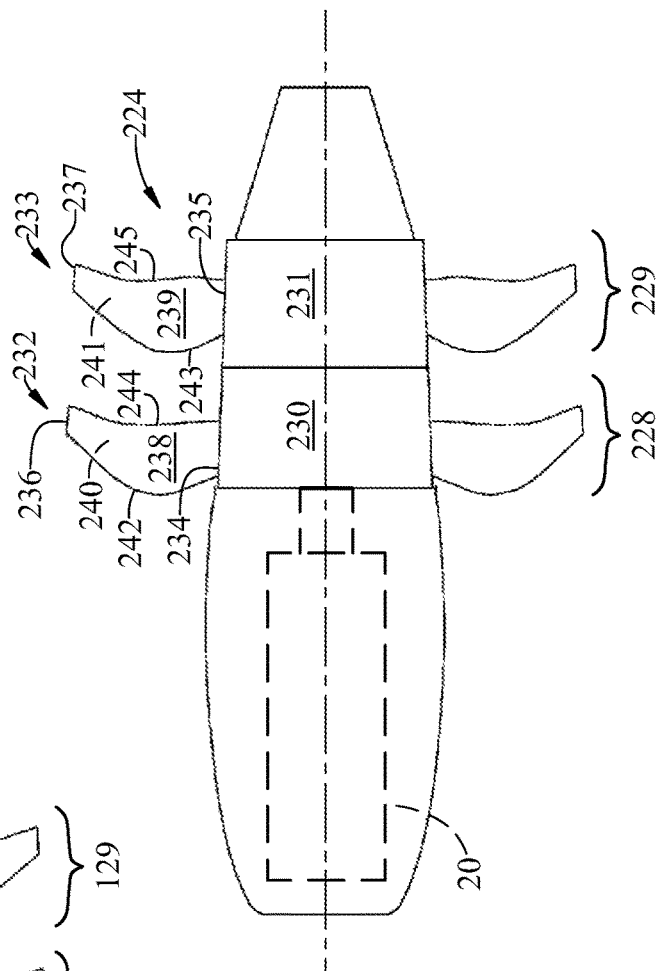
FIG. 9
FIG. 10

OPEN ROTOR AND AIRFOIL THEREFOR

BACKGROUND OF THE INVENTION

The present invention relates generally to aircraft propulsion, and more specifically to aircraft engines incorporating an open rotor for propulsion.

It is well-known to provide aircraft propulsion using open rotors, defined generally as an apparatus including a rotatable hub carrying an array of airfoils which are configured to produce thrust, and which are not surrounded by an outer shroud.

One type of open rotor is a conventional propeller. These are mainly used for low-speed applications and generally become inefficient at high subsonic speeds.

There is an interest in using open rotors to propel higher-speed vehicles using blades optimized therefor; these types of open rotor are often referred to as "prop fans" or "unducted fans". In high-speed subsonic flight, the combination of rotor rotational speed, blade radius, and flight speed results in blade speeds that are supersonic through surrounding air, particularly at the outer span. When the flow approaching a blade leading edge is supersonic in the rotor frame-of-reference, and if leading edge sweep along the blade span is relatively low, then a bow shock wave (or simply "bow shock") will exist upstream of the leading edge. Open rotor bow shocks propagate away from the rotor and potentially generate noise, as well as efficiency losses.

Accordingly, in the prior art, it is generally accepted practice that high-speed open rotor blades must use thin leading edges, to minimize the size, strength, and effect of bow shock waves. However, one problem with blades using thin leading edges is that they do not operate efficiently at large positive and negative angles of blade airflow incidence.

BRIEF DESCRIPTION OF THE INVENTION

This problem is addressed by an open rotor blade for high speed subsonic flight having mechanical sweep combined with a relatively thick leading edge.

According to one aspect of the technology described herein, an airfoil apparatus for an open rotor includes: an airfoil body having spaced-apart pressure and suction sides extending radially in span from a root to a tip, and extending axially in chord between spaced-apart leading and trailing edges; wherein a majority of the leading edge within an outer portion of the airfoil body has an aft sweep equal to or greater than a predetermined sweep profile, wherein the predetermined sweep profile is selected to produce a blade-relative velocity component perpendicular to the leading edge, at a tip radius of the airfoil body, of Mach 0.75 or less, and to produce a blade-relative velocity component perpendicular to the leading edge, at 65% of the tip radius, of Mach 0.87 or less, with the blade-relative velocity component perpendicular to the leading edge varying linearly between the two limits, in the presence of transonic or supersonic relative velocity conditions; and wherein each of the blades has a leading edge thickness greater than 0.45% of the chord, measured at a 0.5% chordwise location.

According to another aspect of the technology described herein, an open rotor apparatus includes: a first airfoil row including a first disk rotatable about an axial centerline and carrying an annular array of airfoil-shaped blades, wherein each of the blades has spaced-apart pressure and suction sides extending radially in span from a root to a tip, and extending axially in chord between spaced-apart leading and trailing edges, wherein each of the blades of the first airfoil row has a leading edge forward sweep or aft sweep within an outer portion thereof, and a leading edge thickness greater than 0.45% of the chord, measured at a 0.5% chordwise location, within the outer portion; and a second airfoil row disposed downstream of the first airfoil row.

According to another aspect of the technology described herein, a method is provided for operating an open rotor apparatus including a disk rotatable about an axial centerline and carrying a row of airfoil-shaped blades, wherein each of the blades includes spaced-apart pressure and suction sides extending radially in span from a root to a tip, and extending axially in chord between spaced-apart leading and trailing edges. The method includes: powering the open rotor to propel an aircraft in selected flight conditions including a flight Mach number greater than 0.72 and a tip speed of the blades greater than 500 feet per second; wherein each of the blades has a leading edge aft sweep in an outer portion thereof, the sweep configured to produce a blade-relative velocity component perpendicular to the leading edge, of Mach 0.87 or less within an outer 35% of a tip radius of the blade, at the selected flight conditions; and wherein each of the blades has a leading edge thickness greater than 0.45% of the chord, measured at a 0.5% chordwise location.

BRIEF DESCRIPTION OF THE DRAWINGS

The invention may be best understood by reference to the following description taken in conjunction with the accompanying drawing figures in which:

FIG. 9 is a side view of an alternative open rotor;

FIG. 10 is a side view of an alternative open rotor; and

DETAILED DESCRIPTION OF THE INVENTION

Figure 1:
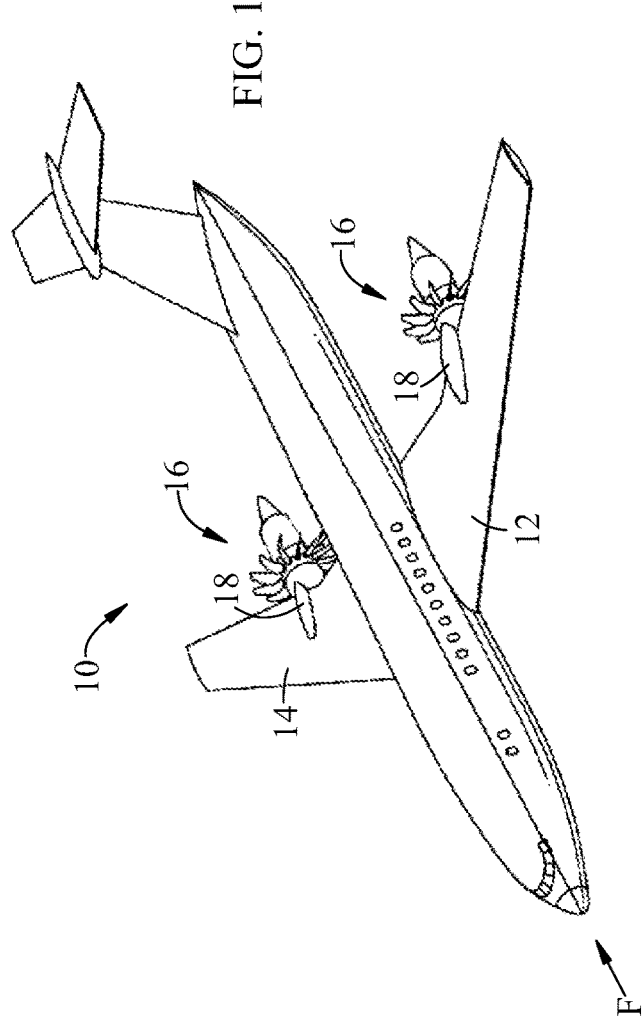
FIG. 1 is an illustration of an aircraft including an exemplary open rotor.

Referring to the drawings wherein identical reference numerals denote the same elements throughout the various views, FIG. 1 illustrates schematically an exemplary aircraft 10 including a pair of wings 12 and 14. Each wing 12 and 14 supports a propulsion device 16 via a pylon 18. Alternatively, one or more propulsion devices 16 may be mounted to any suitable location on aircraft 10.

Figure 2:
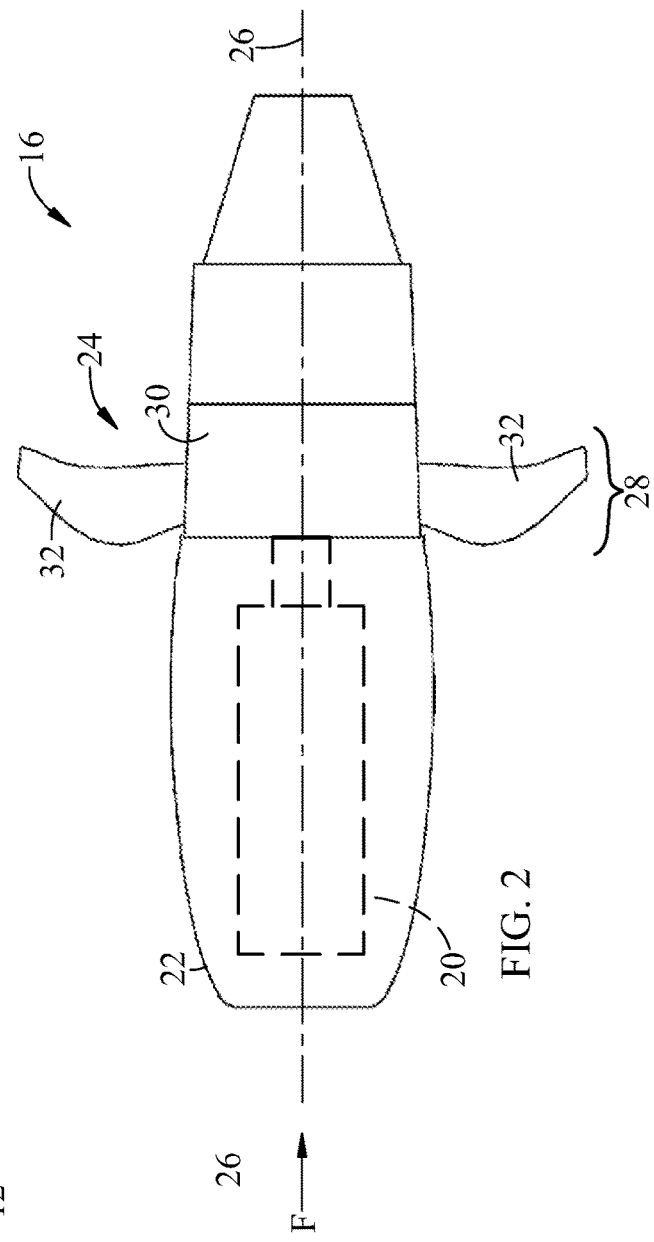
FIG. 2 is a side view of the exemplary open rotor shown in FIG. 1.

Referring to FIG. 2, one of the propulsion devices 16 is shown in more detail. The propulsion device 16 includes a prime mover 20 (shown schematically) enclosed in a nacelle 22 and coupled in driving relationship with an open rotor 24 that is mounted for rotation about a centerline axis 26.

It is noted that, as used herein, the terms "axial" and "longitudinal" both refer to a direction parallel to the centerline axis 26, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrows "F" in FIGS. 1 and 2. These directional terms are used merely for convenience in description and do not require a particular orientation of the structures described thereby.

The prime mover 20 may be any device operable to rotate the open rotor 24 at the required speed under expected mechanical and aerodynamic loads. Nonlimiting examples of prime movers include heat engines, motors (e.g. electric, hydraulic, or pneumatic), or combinations thereof (for example electric hybrid drivetrains). In one example, the prime mover 20 may be a gas turbine engine having a core including a compressor, a combustor and one or more turbines. The open rotor 24 may be driven directly by the prime mover 20, or through an intermediate geartrain.

In the illustrated example, the open rotor 24 is a single-stage open rotor including a single airfoil row 28 comprising a rotatable disk or hub 30 having an annular array of rotor blades 32 extending therefrom.

Figure 3:
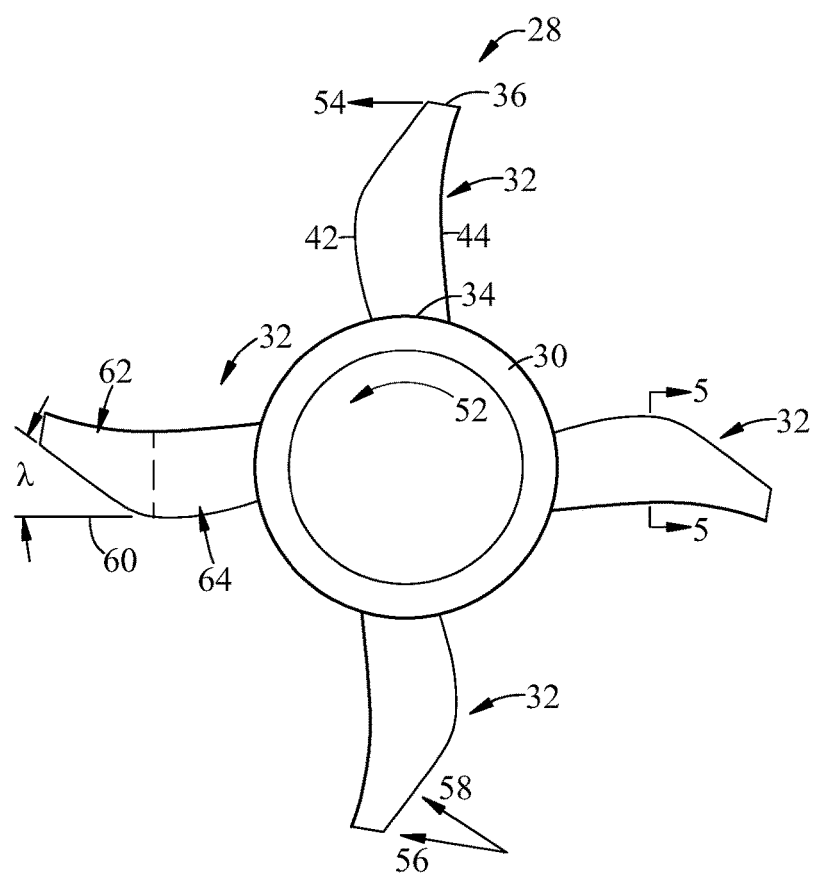
FIG. 3 is a schematic front elevation view of the open rotor shown in FIG. 1.
Figure 4:
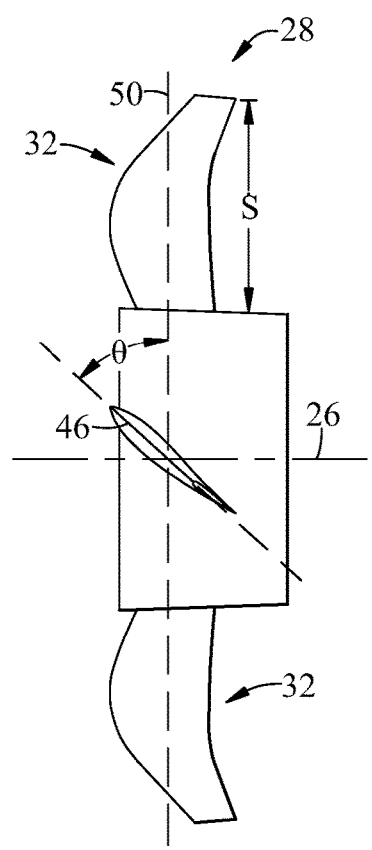
FIG. 4 is a schematic side elevation view of the open rotor shown in FIG. 1.
Figure 5:
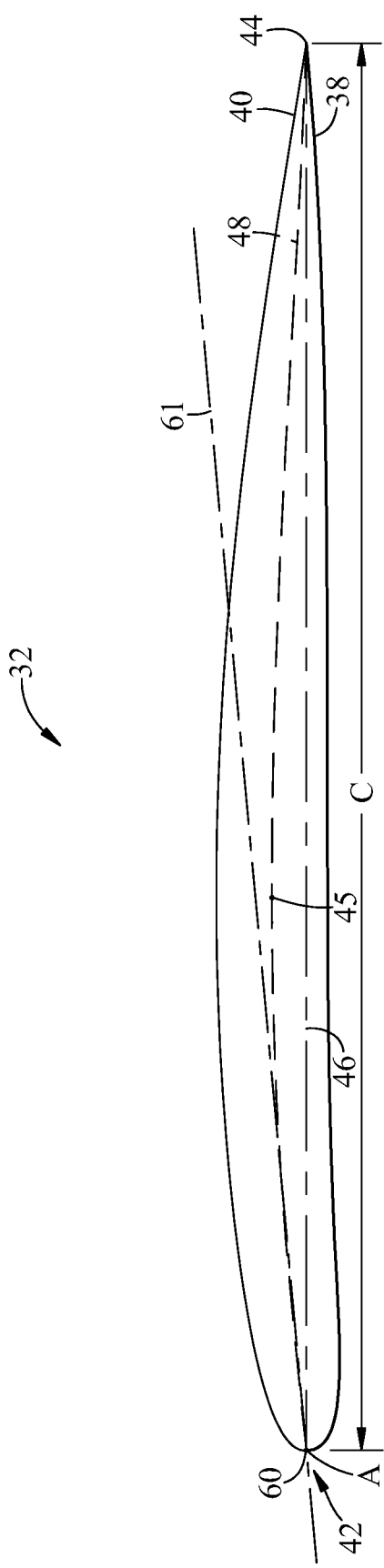
FIG. 5 is a schematic sectional view taken along lines 5-5 of FIG. 3.

Referring to FIGS. 3-5, each blade 32 extends from a root 34 at the hub 30 to a tip 36, and includes a generally concave pressure side 38 joined to a generally convex suction side 40 at a leading edge 42 and a trailing edge 44. The blade 32 may be represented as an array or "stack" of individual airfoil sections arrayed along a spanwise stacking line 45. FIG. 5 illustrates one such airfoil section. For each individual airfoil section of the blade 32, an imaginary straight line referred to as a "chord line" 46 connects the leading edge 42 and the trailing edge 44. Also for each individual airfoil section of the blade 32, a curve called the "camber line" 48 represents the locus of points lying halfway between the pressure and suction sides 38, 40. Although not shown in the illustrated example, it will be understood that the blade 32 may incorporate "twist", a feature in which the stacked airfoil sections are rotated relative to each other about the spanwise stacking line 45, or "lean", a feature in which the stacked airfoil sections are laterally shifted relative to each other.

The blades 32 may be made from suitable high strength materials such as metal alloys (e.g. iron, nickel, or titanium alloys) or composite materials, such as carbon reinforcing fibers in an epoxy matrix, with or without metallic shielding.

In operation, the hub 30 rotates about the centerline axis 26, and the blades 32 sweep through a blade plane 50 which is perpendicular to the centerline axis 26. Airfoil sections of the blades 32 are each disposed at pitch angle θ, dependent on radius (the blades 32 may incorporate twist) and measured between the blade's chord line 46 and the blade plane 50. A relatively small pitch angle θ is typically referred to as a "flat" or "fine" or "low" pitch, and a relatively large pitch angle θ is typically referred to as a "steep" or "coarse" or "high" pitch. It will be understood that in general, the appropriate pitch angle θ for efficient propulsion increases with increasing aircraft speed.

The blades 32 may have a "fixed pitch" configuration in which the airfoil section pitch angles θ of the blades 32 cannot be changed. Alternatively, the blades 32 may have a "variable pitch" configuration in which the airfoil section pitch angles θ of the blades 32 may be uniformly varied (i.e. same pitch angle change for all airfoil sections) in flight. A variable-pitch open rotor may be used to provide thrust efficiently at both high and low speeds. One or more conventional pitch change actuators (not shown) may be used to effect pitch changes.

Each blade 32 has a span (or span dimension) "S" defined as the radial distance from the root 34 to the tip 36, and a chord (or chord dimension) "C" defined as the length of the chord line 46. The chord dimension may be constant over the span S, or it may vary over the span S, as shown.

The blades 32 are particularly adapted for efficient operation at high subsonic flight speeds. As used herein, the term "flight speed" refers to the speed of the aircraft 10 generally parallel to its longitudinal axis, also referred to as "airspeed" or "flight Mach number". The blades 32 are particularly useful in an open rotor 24 for an aircraft operating at a flight Mach number greater than 0.72 or the equivalent airspeed.

In operation, the blades 32 rotate at various shaft speeds or rotor speeds (expressed as RPM or as an angular velocity), depending upon the phase of flight. The tangential velocity of any given point on the blade 32, that is, its linear speed in a tangential direction, may be computed as the radius of that point from the centerline axis 26 multiplied by the angular velocity, shown at arrow 52.

It will be understood that, for any given rotor speed, the tangential velocity of the blade 32 increases as radius increases, and that the maximum tangential velocity for any rotor speed occurs at the tip 36. The tangential velocity at the tip 36 is generally referred to as the "tip speed", shown at arrow 54. This is a significant parameter for blade operation, as the tip 36 would generally be the first location on the blade 32 to experience transonic effects in flight. The blades 32 of the illustrated open rotor 24 would be routinely operated during high-subsonic cruise flight at tip speeds exceeding 152 m/s (500 ft/sec).

In flight, the blade 32 experiences a "blade-relative velocity" or "relative Mach number", shown at arrow 56. It will be understood that the blade-relative velocity is a three-dimensional vector quantity with axial, radial, and tangential components. Assuming the radial velocity to be zero, and ignoring secondary factors, the blade-relative velocity at the tip is the vector sum of the tip speed and the flight speed. The blade-relative velocity is approximately equivalent to the speed of the relative wind parallel to the chord line 46 of the blade 32.

Under some operating conditions, for example in the airspeed and tip speed conditions described above, all or portions of the blades 32 will experience blade-relative velocities that exceed the local speed of sound. For flow around the blades with substantial regions of both subsonic (Mach numbers less than 1.0) and supersonic (Mach numbers greater than 1.0) blade-relative velocities, the flow field and blade operating regime is called transonic, and for mostly supersonic flow around the blades, the flow field and blade operating regime is called supersonic.

The existence and strength of bow shocks upstream of the blade's airfoil sections in the presence of supersonic relative flow approaching the leading edge depends upon the component, generally varying spanwise along the edge, of the blade-relative velocity perpendicular to the leading edge 42. This component is shown at arrow 58. The leading edge 42 may incorporate a property known as "sweep", which lowers the blade-relative velocity component normal to the leading edge 42 (also referred to as the "edge-normal velocity component") and decreases the bow shock strength. When the edge-normal velocity component is locally subsonic there is no associated bow shock.

Figure 11:
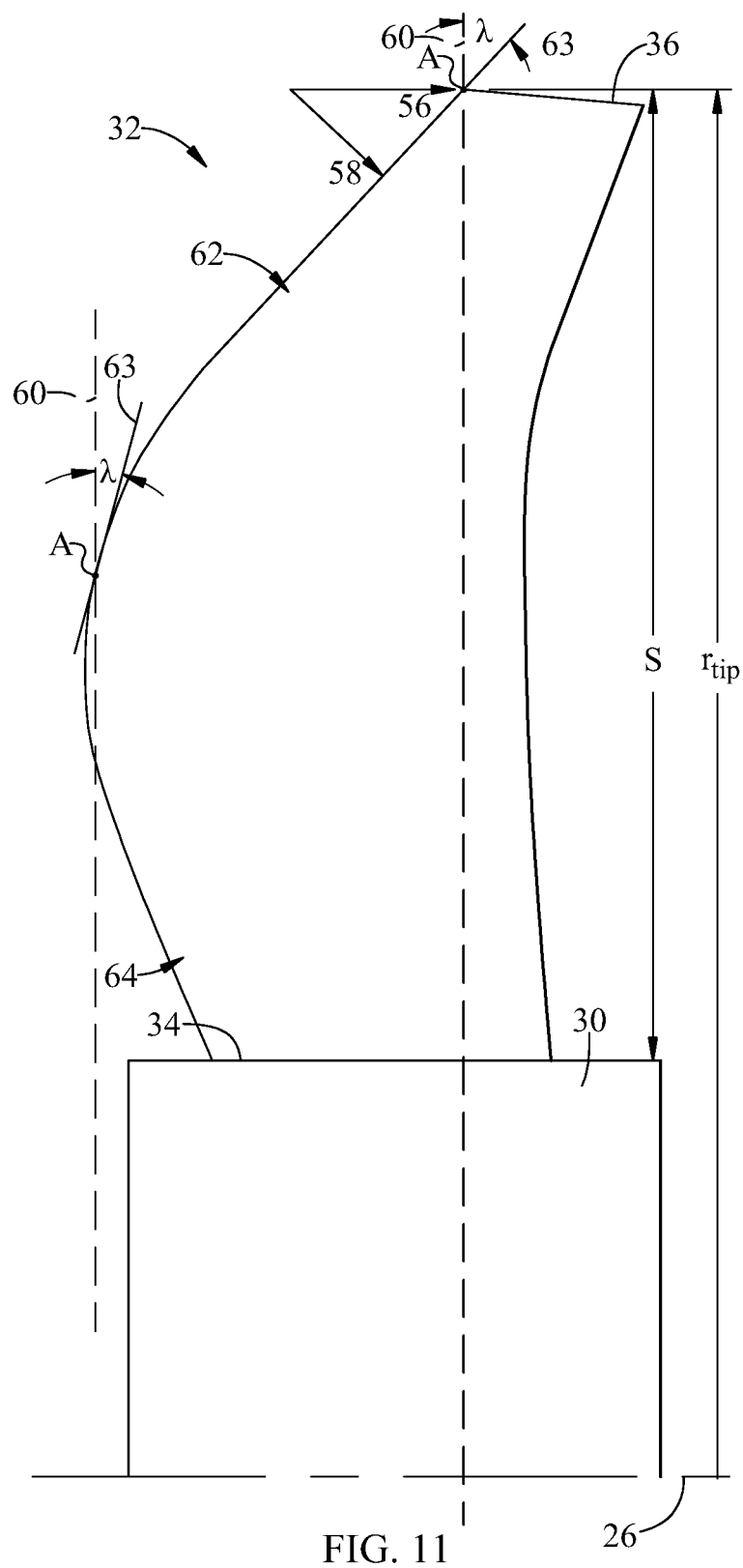
FIG. 11 is a schematic side elevation view orthogonal to the plane shown in FIG. 5.

The definition of leading edge sweep as used herein may be understood with reference to FIGS. 5 and 11. A reference line 60 extends in the pure radial direction away from the centerline axis 26 and passes through a local point "A" on the leading edge 42. A plane 61 containing the line 60 is oriented so as to be tangent to the airfoil section camber line 48 at point A. The locus of leading edge points 42 in the vicinity of point A are projected to the plane 61 by orthogonal projection (In the illustrated example, no twist or lean is shown, and so the leading edge points near to point A lie in the plane 61). The angle of local leading edge sweep λ subtends an arc between the radial line 60 and a line 63 in the plane 61 that is tangent to the projected curve at point A. Sweep angle λ is conventionally defined as positive for aft sweep, as depicted in FIG. 3.

The leading edge 42 within an outer portion 62 of the blade 32 incorporates forward or aft sweep (aft sweep is illustrated). The line separating an inner portion 64 from the outer portion 62 would be set depending on the location where blade-relative flow velocities are expected to become supersonic just upstream of the rotor, at some particular operating condition (rotational speed, altitude, and flight Mach number).

For descriptive purposes, reference will be made to the "tip radius", labeled $r_{tip}$, of the blade 32. The tip radius $r_{tip}$ is the radial distance from the centerline 26 to the tip 36 of the blade 32 at the leading edge 42. A point located at the tip 36 would be referred to as 100% of tip radius $r_{tip}$, and a point at the centerline 26 would be referred to as 0% of tip radius $r_{tip}$. In one example, the demarcation between the outer portion 62 and the inner portion 64 may be located at approximately 65% of the tip radius $r_{tip}$. In the illustrated example, the outer radius of the hub 30 is approximately 30% of the tip radius $r_{tip}$, and so the demarcation at 65% of tip radius $r_{tip}$ would correspond to approximately 50% of the span S.

The leading edge sweep may be configured to achieve a specific distribution of blade-relative velocities perpendicular to the leading edge 42 within the outer portion 62. To calculate the minimum sweep angle, $\lambda_{min}$, at some tip radius fraction, $r/r_{tip}$ (or the equivalent percentage of tip radius), the specified parameters are flight Mach, $M_0$, ambient speed of sound, $a_0$, blade tip speed, $U_{tip}$, and the desired edge-normal velocity (Mach) component, $M_n$.

Blade-relative Mach number, $M_{rel}$, is first computed:

$$M_u = U_{tip} * (r/r_{tip})/a_0 \quad (1)$$

$$M_{rel} = \mathrm{sqrt}(M_0^2 + M_u^2) \quad (2)$$

Then the minimum sweep angle $\lambda_{min}$ in degrees is computed:

$$\lambda_{min} = 90 - \arcsin(M_n/M_{rel}), \text{ arcsine angle in degrees,} \\ M_{rel} \geq M_n \quad (3)$$

When $M_{rel}$ is less than $M_n$, then a minimum sweep angle is not calculated or specified.

Generally, the sweep angle λ of the leading edge 42 may be configured to produce a desired subsonic edge-normal relative Mach number at a selected flight Mach number and tip speed. In one example, the sweep angle λ at the tip radius $r_{tip}$ may be configured to produce an edge-normal relative Mach number of 0.75 or less, at a flight Mach number of 0.72 or greater, and a tip speed of 152 m/s (500 ft/s) or greater. In one example of a blade satisfying these criteria, a leading edge aft sweep angle λ may be greater than 45° within the outer 5% of the blade tip radius $r_{tip}$ (that is, at locations from 95% to 100% of the tip radius $r_{tip}$), and greater than 40° within the outer 10% of the blade tip radius $r_{tip}$. If desired, the leading sweep angle λ may be constant over the entire outer portion 62 of the blade 32.

Alternatively, the leading edge 42 may incorporate a spanwise varying sweep angle λ. In one example, the sweep angle λ at the tip radius $r_{tip}$ (100% of tip radius) may be configured to produce an edge-normal relative Mach number of 0.75 or less, at a flight Mach number of 0.72 or greater and a tip speed of 152 m/s (500 ft/s) or greater. Simultaneously, the sweep angle λ at 65% of the tip radius $r_{tip}$ may be configured to produce an edge-normal relative Mach number of 0.87 or less, at the same flight Mach number and tip speed. The sweep angle λ in the range between these two endpoints may be varied according to the equations set forth above so as to produce an edge-normal Mach number obtained by linear interpolation between the two values set forth above, or an edge-normal Mach number less than the interpolated value. It is sufficient for the purposes of the present invention that a majority of the leading edge 42 lying within 65%-100% of tip radius includes a sweep angle λ equal or greater to the sweep angle defined by this sweep profile. In one example of a blade 32 satisfying these criteria, a leading edge aft sweep angle λ may be as desired from 65% to 75% of the tip radius $r_{tip}$, at least 9° at 80% of the tip radius $r_{tip}$, increasing to a value greater than 32° at the tip radius $r_{tip}$.

In another example, the sweep angle λ at the tip radius $r_{tip}$ may be configured to produce an edge-normal relative Mach number of approximately 0.75 or less, at a flight Mach number of approximately 0.78, and a tip speed of 198 m/s (650 ft/s) or greater. Simultaneously, the sweep angle λ at 65% of the tip radius $r_{tip}$ may be configured to produce an edge-normal relative Mach number of 0.87 or less, at the same flight Mach number and tip speed. The sweep angle λ in the range between these two endpoints may be varied according to the equations set forth above so as to produce an edge-normal Mach number obtained by linear interpolation between the two values set forth above, or an edge-normal Mach number less than the interpolated value. It is sufficient for the purposes of the present invention that a majority of the leading edge 42 lying within 65%-100% of tip radius includes a sweep angle λ equal to or greater than the sweep angle defined by this sweep profile. In one example of a blade 32 satisfying these criteria, a leading edge aft sweep angle λ may be at least 13° at 65% of the tip radius $r_{tip}$, increasing to a value greater than 43° at the tip radius $r_{tip}$.

In another example, the sweep angle λ in the tip radius $r_{tip}$ may be configured to produce an edge-normal relative Mach number of approximately 0.75 or less, at a flight Mach number of approximately 0.76, and a tip speed of 168 m/s (550 ft/s) or greater. Simultaneously, the sweep angle λ at 65% of the tip radius $r_{tip}$ may be configured to produce an edge-normal relative Mach number of 0.87 or less, at the same flight Mach number and tip speed. The sweep angle λ in the range between these two endpoints may be varied according to the equations set forth above so as to produce an edge-normal Mach number obtained by linear interpolation between the two values set forth above, or an edge-normal Mach number less than the interpolated value. It is sufficient for the purposes of the present invention that a majority of the leading edge 42 lying within 65%-100% of tip radius includes a sweep angle λ equal to or greater than the sweep angle defined by this sweep profile. In one example of a blade 32 satisfying these criteria, a leading edge aft sweep angle λ may be as desired at 65% of the tip radius $r_{tip}$, at least 5° at 70% of the tip radius $r_{tip}$, increasing to a value greater than 38° at the tip radius $r_{tip}$.

In another example, the sweep angle λ at 65% of the tip radius $r_{tip}$ and beyond (i.e. the outer 35% of the tip radius) may be configured to produce an edge-normal relative Mach number of 0.87 or less, at a flight Mach number of 0.72 or greater, and a tip speed of 152 m/s (500 ft/s) or greater. In another example, the sweep angle λ at the outer 35% of the tip radius may be configured to produce an edge-normal relative Mach number of 0.87 or less, at a flight Mach number of 0.76 or greater, and a tip speed of 152 m/s (500 ft/s) or greater. The sweep in either of these examples may be constant or varying over the span.

In another example, the sweep angle λ at the tip radius $r_{tip}$ may be configured to produce an edge-normal relative Mach number of 0.95 or less, at a flight Mach number of 0.72 or greater, and a tip speed of 152 m/s (500 ft/s) or greater. In an example of a blade 32 satisfying these criteria, a leading edge forward sweep angle λ in the outer portion 62 may be greater than 15° within the outer 10% of the tip radius $r_{tip}$.

For aerodynamic or other reasons, the leading edge 42 of a given blade 32 may incorporate both forward sweep and aft sweep in different portions. In the illustrated example, the inner portion 64 of the leading edge 42 of the blade 32 incorporates forward sweep. For example, the forward sweep in the inner portion 64 may prevent the center of mass of the blade 32 from being too far aft, which might impose excessive mechanical loads on the hub 30.

Figure 6:
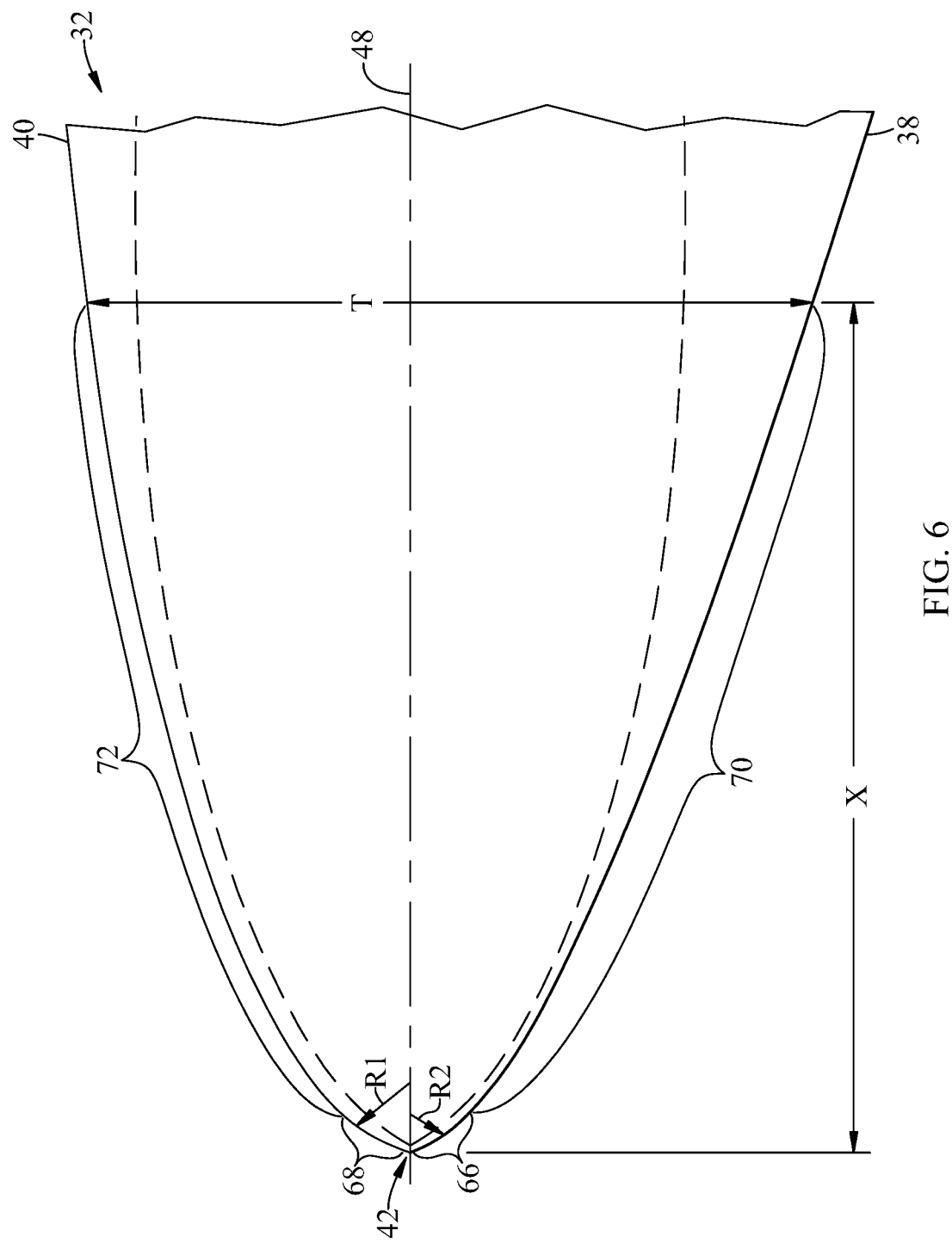
FIG. 6 is a schematic sectional illustration of a leading edge portion of an airfoil of the open rotor shown in FIG. 1.

Portions of the blades 32 lying within the outer portion 62, specifically the leading edge 42 and portions of the blade 32 immediately adjacent it, may incorporate a thickness selected to improve the performance of the blade 32. Referring to FIG. 6, each of the blades 32 has a thickness defined as the distance between the pressure side 38 and the suction side 40. In accordance with conventional practice, thickness is computed as the absolute value of the thickness divided by the chord length, expressed as a percentage.

It will be understood that the thickness in any particular airfoil section of the blade 32 will vary in the chordwise direction, and that the thickness may vary over the span S of the blade 32. For the purposes of the present invention, the dimension of interest is the thickness within the outer portion 62 as described above.

It has been found that a relatively large leading edge thickness value, as compared to prior art practices, is suitable for improving performance and/or avoiding degradation of performance of the blade 32. For reference purposes, the relevant thickness "T" is measured at a distance "X" aft of the leading edge 42 equal to 0.5% of the total chord length, herein referred to as a "0.5% chord location".

At the 0.5% chord location, the thickness may greater than about 0.45% of chord, or in other words, "more than 0.45% thick". The overall design of the blade 32, other than the leading edge and near portions, may be generally conventional. The overall airfoil thickness ratio, that is the maximum thickness of the blade 32, may be on the order of about 2% near the tip, in this example. In another example, the thickness may greater than about 0.5% of chord, at the 0.5% chord location. In another example, the thickness may be greater than about 0.6% of chord, at the 0.5% chord location.

These thick leading edges 42 have several benefits. In particular, the blade airfoils tolerate a wider variation in angle of incidence of the airflow before losing performance or efficiency. This is in contrast to prior art accepted practice for transonic or supersonic blading, which uses thin leading edges. The use of the thick leading edges 42 is made practicable because of the combination with the leading edge sweep as described above.

Generally in the prior art, the leading edge of an open rotor blade would have a leading edge profile with a generally parabolic shape which is generally symmetrical about the camber line 48, as seen in FIG. 6 illustrated with a dashed line. In addition to the relatively large thickness described above, the leading edge 42 of the blades 32 may incorporate asymmetrical shaping in order to improve blade performance.

Figure 7:
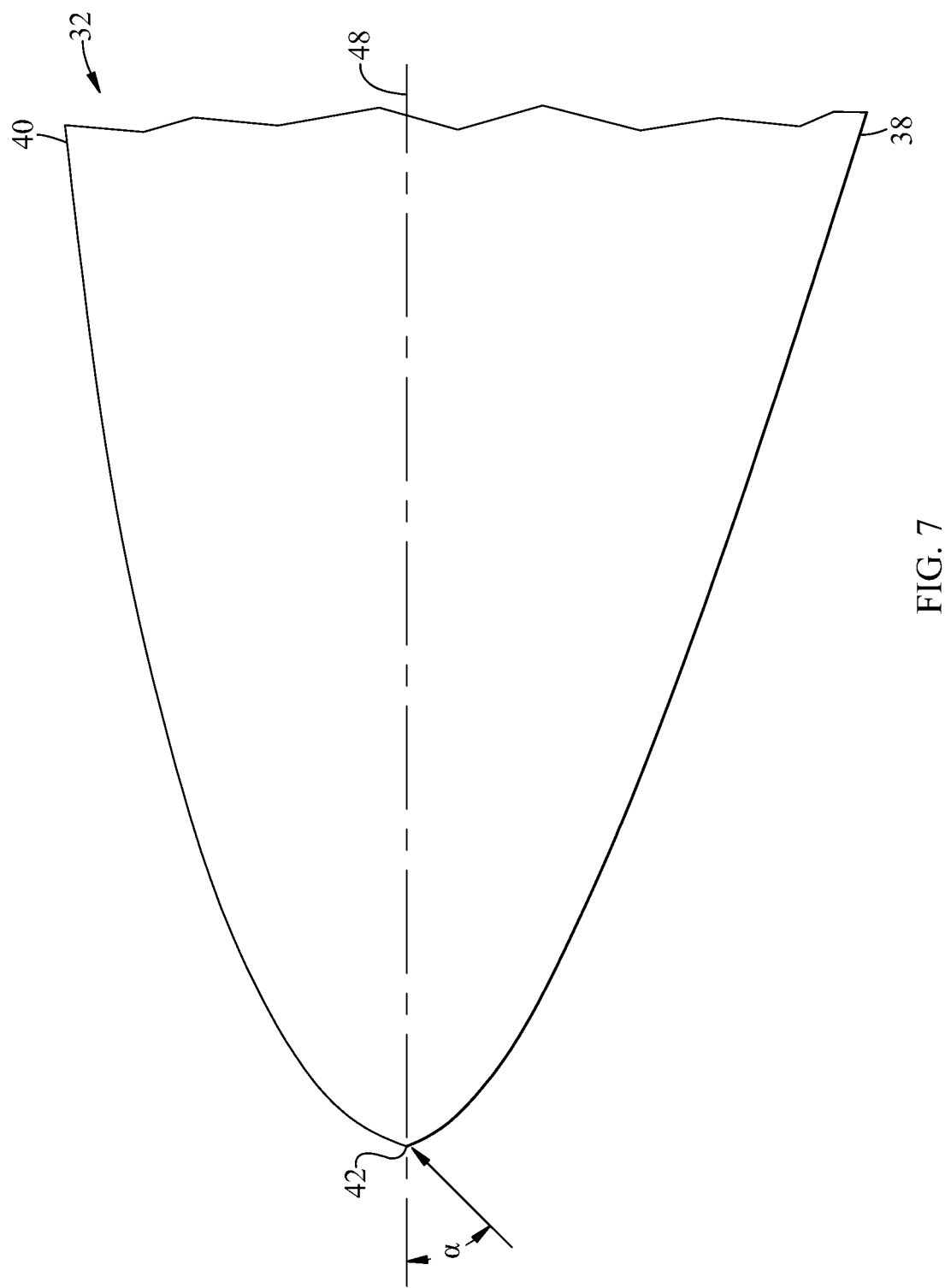
FIG. 7 is a schematic sectional illustration of the leading edge airfoil portion shown in FIG. 6, during operation in a first flight condition.
Figure 8:
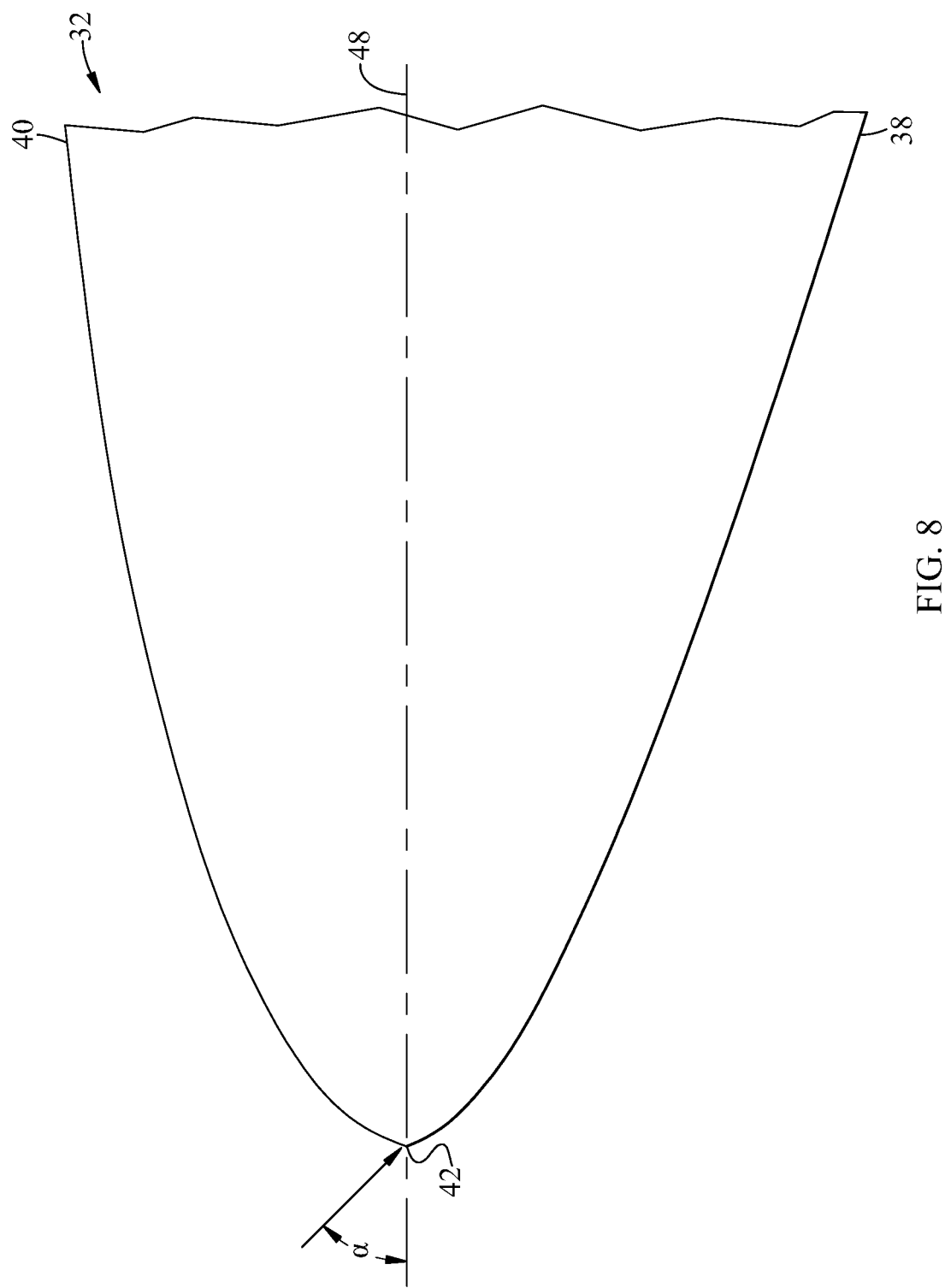
FIG. 8 is a schematic sectional illustration of the leading edge airfoil portion shown in FIG. 6, during operation in a second flight condition.

This asymmetric shaping is shown in FIGS. 6-8 with reference to the leading edge 42 itself which is divided into a pressure side portion 66 and a suction side portion 68 by the mean camber line 48 of the blade 32. A forward portion 70 of the pressure side 38 immediately adjoins the pressure side portion 66 of the leading edge 42, and a forward portion 72 of the suction side 40 immediately adjoins the suction side portion 68 of the leading edge 42.

The suction side portion 68 of the leading edge 42 has a relatively low local curvature (i.e. an edge radius R1 defining its curvature is a relatively large value). The forward portion 72 of the suction side 40 defines a rounded blend into the remainder of the suction side 40.

The pressure side portion 66 of the leading edge 42 has a relatively high local curvature (i.e. an edge radius R2 defining its curvature is a relatively small value). Stated another way, edge radius R2 is smaller than edge radius R1. The forward portion 70 of the pressure side 38 provides a nearly straight-line blending into the remainder of the pressure side 38.

This asymmetric shaping optimizes for both a high positive angle of incidence at low flight Mach numbers and high negative angle of incidence at cruise flight Mach numbers.

For example, FIG. 7 illustrates the operating condition at takeoff, where the relative velocity described above is subsonic and the angle of incidence α is a high positive value, defined here as approaching from the pressure side of the mean camber line 48. In these circumstances, the shaping of the leading edge 42 and the forward portions 68 and 72 of the suction side 40 minimizes undesirable suction side flow separation.

FIG. 8 illustrates the operating condition, for example, during cruise operation where the relative velocity described above is transonic and the angle of incidence α is at least moderately negative, defined here as approaching from the suction side of the mean camber line 48. In these circumstances, the shaping of the leading edge 42 and the forward portions 66 and 70 of the pressure side 38 minimizes the adverse effects of any pressure side local supersonic overexpansion/recompression bubble.

The open rotor 24 described above may be used by powering the open rotor 24 with the prime mover 12 to propel the aircraft 10 in atmospheric flight, such that a relative velocity at the leading edge 42 within the outer portions 62 is transonic or supersonic. For example, the open rotor 24 may be operated at a tip speed greater than about 152 m/s (500 ft/s) and a flight Mach number greater than about 0.72. In another example, the open rotor 24 may be operated at a tip speed greater than about 168 m/s (550 ft/s) and a flight Mach number greater than about 0.76. In general, the term "propelling the aircraft" as used herein refers to an approximately steady-state, sustainable condition achievable by operation of the prime mover 12, for example takeoff, climb, descent, and/or cruise flight, and not to conditions characterized or dominated by transient effects, e.g. achieved in a rapid descent or dive.

The airfoil design principles described above may be applied to other configurations of open rotors. For example, FIG. 9 illustrates an alternative open rotor 124 which is drivingly coupled to a prime mover 20. In the illustrated example, the open rotor 124 includes a first or forward airfoil row 128, and a second or aft airfoil row 129.

The prime mover 20 may be configured to rotate the forward and aft airfoil rows in opposite directions (counter-rotating).

The forward airfoil row 128 comprises a hub or disk 130 having a plurality of blades 132 extending therefrom. Each blade 132 extends from a root 134 at the hub 130 to a tip 136, and includes a generally concave pressure side 138 joined to a generally convex suction side 140 at a leading edge 142 and a trailing edge 144. Each blade 132 has a span and a chord, as defined above, and the blades 132 can be uniformly or non-uniformly spaced around the hub 130.

The characteristics of the blades 132 (i.e. sweep, thickness, and/or airfoil section shaping) may be the same as or similar to those of the blades 32 described above.

The aft airfoil row 129 comprises a hub or disk 131 having a plurality of blades 133 extending therefrom. Each blade 133 extends from a root 135 at the hub 131 to a tip 137 and includes a generally concave pressure side 139 joined to a generally convex suction side 141 at a leading edge 143 and a trailing edge 145. Each blade 132 has a span and a chord, as defined above, and the blades 133 can be uniformly or non-uniformly spaced around the hub 131.

The characteristics of the blades 131 (i.e. sweep, thickness, and/or airfoil section shaping) may be the same as or similar to those of the blades 32 described above.

FIG. 10 illustrates an alternative open rotor 224 which is drivingly coupled to a prime mover 20. In the illustrated example, the open rotor 224 includes a first or forward airfoil row 228, and a second or aft airfoil row 229. In this embodiment, the first airfoil row 228 rotates while the second airfoil row 229 is stationary.

The forward airfoil row 228 comprises a hub or disk 230 having a plurality of blades 232 extending therefrom. Each blade 232 extends from a root 234 at the hub 230 to a tip 236 and includes a concave pressure side 238 joined to a convex suction side 240 at a leading edge 242 and a trailing edge 244. Each blade 232 has a span and a chord, as defined above, and the blades 232 can be uniformly or non-uniformly spaced around the hub 230.

The characteristics of the blades 232 (i.e. sweep, thickness, and/or airfoil section shaping) may be the same as those of the blades 32 described above.

The aft airfoil row 229 comprises a stationary hub 231 having a plurality of outlet guide vanes 233 extending therefrom. Each outlet guide vane 233 extends from a root 235 at the hub 231 to a tip 237 and includes a concave pressure side 239 joined to a convex suction side 241 at a leading edge 243 and a trailing edge 245. Each outlet guide vane 233 has a span and a chord, as defined above, and the outlet guide vanes 233 can differ from one another and can be uniformly or non-uniformly spaced around the hub 231.

The aerodynamic characteristics of the outlet guide vanes 233 (i.e. sweep, thickness, and/or airfoil section shaping) may be the same as or similar to those of the blades 32 described above.

The open rotor designs described above are expected to provide an increase in aerodynamic efficiency thereof as compared to prior art open rotors. They can potentially allow lower takeoff rotational speeds with higher blade efficiencies and lower noise, while maintaining good blade aerodynamics and efficiency during high speed flight. They can also potentially improve system integration, particularly the variation in rotor speed between takeoff and cruise. They also reduce aerodynamic sensitivity to leading edge shape, ease leading edge fabrication, and naturally increase resistance to foreign object damage.

The foregoing has described an airfoil for an open rotor, an open rotor apparatus, and a method for its operation. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. An airfoil apparatus for an open rotor, comprising:
    an airfoil body having spaced-apart pressure and suction sides extending radially in span from a root to a tip, and extending axially in chord between spaced-apart leading and trailing edges;
    wherein a majority of the leading edge within an outer portion of the airfoil body has an aft sweep equal to or greater than a predetermined sweep profile, wherein the predetermined sweep profile is selected to produce a blade-relative velocity component perpendicular to the leading edge, at a tip radius of the airfoil body, of Mach 0.75 or less, and to produce a blade-relative velocity component perpendicular to the leading edge, at 65% of the tip radius, of Mach 0.87 or less, with the blade-relative velocity component perpendicular to the leading edge varying linearly between the two limits, in the presence of transonic or supersonic relative velocity conditions; and
    wherein the leading edge has a thickness greater than 0.45% of the chord, measured at a 0.5% chordwise location.

2. The apparatus of claim 1 wherein the leading edge is asymmetrically shaped relative to a mean camber line of the airfoil body.

3. The apparatus of claim 2 wherein the leading edge includes:
    a suction side portion disposed on one side of the mean camber line, and being defined by a first radius of curvature; and
    a pressure side portion disposed on an opposite side of the mean camber line from the suction side portion, and being defined by a second radius of curvature which is smaller than the first radius of curvature.

4. The apparatus of claim 3 wherein the airfoil body includes a forward portion of the suction side immediately adjoining the suction side portion of the leading edge, and a forward portion of the pressure side immediately adjoining the pressure side portion of the leading edge, wherein the forward portion of the pressure side has a lesser curvature than the forward portion of the suction side.

5. The apparatus of claim 1 wherein the transonic or supersonic relative velocity conditions comprise flight of an aircraft at a flight Mach number greater than 0.72, and a tip speed of the airfoil body greater than 500 feet per second.

6. The apparatus of claim 1 further comprising a disk rotatable about an axial centerline and carrying a first airfoil row of the airfoil bodies.

7. The apparatus of claim 6 wherein each of the airfoil bodies has a local blade leading edge aft sweep angle greater than 45° within an outer 5% of the tip radius, and a local blade leading edge aft sweep angle greater than 40°, within an outer 10% of the tip radius.

8. An open rotor apparatus, comprising:
a first airfoil row including a first disk rotatable about an axial centerline and carrying an annular array of airfoil-shaped blades, wherein each of the blades has spaced-apart pressure and suction sides extending radially in span from a root to a tip, and extending axially in chord between spaced-apart leading and trailing edges, wherein each of the blades of the first airfoil row has a leading edge forward sweep or aft sweep within an outer portion thereof, and a leading edge thickness greater than 0.45% of the chord, measured at a 0.5% chordwise location, within the outer portion; and
a second airfoil row disposed downstream of the first airfoil row.

9. The apparatus of claim 8 wherein the sweep is configured to produce a subsonic blade-relative velocity component perpendicular to the leading edge, over the entirety of the outer portion, in the presence of transonic or supersonic relative velocity conditions.

10. The apparatus of claim 9 wherein the transonic or supersonic relative velocity conditions comprise flight of an aircraft at a flight Mach number greater than 0.72, and a tip speed of the blades greater than 500 feet per second.

11. The apparatus of claim 8 wherein the sweep varies along the span and a majority of the outer portion has a sweep equal to or greater than a predetermined sweep profile, wherein the predetermined sweep profile is selected is selected to produce a blade-relative velocity component perpendicular to the leading edge, at a tip radius of the blade, of Mach 0.75 or less, and to produce a blade-relative velocity component perpendicular to the leading edge, at 65% of the tip radius, of Mach 0.87 or less, with the blade-relative velocity component perpendicular to the leading edge varying linearly between the two limits, in the presence of transonic or supersonic relative velocity conditions.

12. The apparatus of claim 8 wherein the leading edge of each of the blades is asymmetrically shaped relative to a mean camber line of the blade.

13. The apparatus of claim 12 wherein the leading edge of each of the blades includes:
a suction side portion disposed on one side of the mean camber line, and being defined by a first radius of curvature; and
a pressure side portion disposed on an opposite side of the mean camber line from the suction side portion, and being defined by a second radius of curvature which is smaller than the first radius of curvature.

14. The apparatus of claim 13 wherein each of the blades includes a forward portion of the suction side immediately adjoining the suction side portion of the leading edge, and a forward portion of the pressure side immediately adjoining the pressure side portion of the leading edge, wherein the forward portion of the pressure side has a lesser curvature than the forward portion of the suction side.

15. The apparatus of claim 8 wherein each of the blades has a local blade leading edge aft sweep angle greater than 45° within the outer 5% of a tip radius of the blade, and a local blade leading edge aft sweep angle greater than 40° within the outer 10% of the tip radius.

16. The apparatus of claim 8 wherein each of the blades has a local blade leading edge forward sweep angle greater than 15° within the outer 10% of a tip radius of the blade.

17. The apparatus of claim 8 wherein the outer portion comprises approximately 35% of a tip radius of each of the blades.

18. The apparatus of claim 8 wherein the second airfoil row comprises an annular array of airfoil-shaped outlet guide vanes, wherein each of the outlet guide vanes includes spaced-apart pressure and suction sides extending radially in span from a root to a tip, and extending axially in chord between spaced-apart leading and trailing edges.

19. The apparatus of claim 18 wherein each of the outlet guide vanes of the second airfoil row has a leading edge forward sweep or aft sweep within an outer portion thereof, and a leading edge thickness greater than 0.45% of the chord, measured at a 0.5% chordwise location, within the outer portion.

20. The apparatus of claim 19 wherein the leading edge of each of the outlet guide vanes is asymmetrically shaped relative to a mean camber line of the outlet guide vane.

21. The apparatus of claim 8 wherein the second airfoil row comprises a second disk disposed aft of the first disk, the second disk rotatable about the axial centerline and carrying a row of airfoil-shaped blades, wherein each of the blades of the second airfoil row includes spaced-apart pressure and suction sides extending radially in span from a root to a tip, and extending axially in chord between spaced-apart leading and trailing edges, and wherein the blades of the second airfoil row are configured for rotation opposite to those of the first airfoil row.

22. A method of operating an open rotor apparatus including a disk rotatable about an axial centerline and carrying a row of airfoil-shaped blades, wherein each of the blades includes spaced-apart pressure and suction sides extending radially in span from a root to a tip, and extending axially in chord between spaced-apart leading and trailing edges, the method comprising:
powering the open rotor to propel an aircraft in selected flight conditions including a flight Mach number greater than 0.72 and a tip speed of the blades greater than 500 feet per second;
wherein each of the blades has a leading edge aft sweep in an outer portion thereof, the sweep configured to produce a blade-relative velocity component perpendicular to the leading edge, of Mach 0.87 or less within an outer 35% of a tip radius of the blade, at the selected flight conditions; and
wherein each of the blades has a leading edge thickness greater than 0.45% of the chord, measured at a 0.5% chordwise location.

23. The method of claim 22 wherein the sweep varies along the span and a majority of the outer portion has a sweep equal to or greater than a predetermined sweep profile, wherein the predetermined sweep profile is selected to produce a blade-relative velocity component perpendicular to the leading edge, at the tip radius, of Mach 0.75 or less, and to produce a blade-relative velocity component perpendicular to the leading edge, at 65% of the tip radius, of Mach 0.87 or less, with the blade-relative velocity component perpendicular to the leading edge varying linearly between the two limits, at the selected flight conditions.

24. The method of claim 22 wherein the selected flight conditions include a flight Mach number of approximately 0.76 and a tip speed of the blades of at least 550 feet per second.

25. The method of claim 22 wherein the leading edge of each of the blades is asymmetrically shaped relative to a mean camber line of the blade.

26. The method of claim 22 wherein the leading edge of each of the blades includes:
   a suction side portion disposed on one side of the mean camber line, and being defined by a first radius of curvature; and
   a pressure side portion disposed on an opposite side of the mean camber line from the suction side portion, and being defined by a second radius of curvature which is smaller than the first radius of curvature.

27. The method of claim 22 wherein each of the blades includes a forward portion of the suction side immediately adjoining the suction side portion of the leading edge, and a forward portion of the pressure side immediately adjoining the pressure side portion of the leading edge, wherein the forward portion of the pressure side has a lesser curvature than the forward portion of the suction side.

\* \* \* \* \*